United States Patent [19]

Crawford et al.

[11] Patent Number: 5,030,286

[45] Date of Patent: Jul. 9, 1991

[54] HIGH SOLIDS AQUEOUS SILICA SLURRY

[75] Inventors: Roger A. Crawford, Wadsworth; Thomas G. Krivak, Akron, both of Ohio; Patrick G. Malloy, Menasha, Wis.; Da-Hung Yang, Hudson, Ohio

[73] Assignee: PPG Industries, Inc., Pittsburgh, Pa.

[21] Appl. No.: 396,402

[22] Filed: Aug. 14, 1989

Related U.S. Application Data

[63] Continuation-in-part of Ser. No. 248,852, Sep. 22, 1988.

[51] Int. Cl.$^5$ ............................................. C04B 31/00
[52] U.S. Cl. .................................................. 106/435
[58] Field of Search ........................................ 106/435

[56] References Cited

U.S. PATENT DOCUMENTS

| | | | |
|---|---|---|---|
| 3,118,780 | 1/1964 | Dunn | 106/435 |
| 3,264,130 | 8/1966 | Mays | 106/435 |
| 3,328,124 | 6/1967 | Mays | 106/435 |
| 3,846,148 | 11/1974 | Nordyke | 106/435 |
| 3,850,655 | 11/1974 | Adams | 106/435 |
| 4,011,096 | 3/1977 | Sandell | 106/435 |

*Primary Examiner*—Peter D. Rosenberg
*Attorney, Agent, or Firm*—Irwin M. Stein

[57] ABSTRACT

Described are high solids aqueous slurries of amorphous precipitated hydrated silica, which slurries are of relatively low viscosity. The slurry typically contains from about 40 to about 60 weight percent of hydrated precipitated high structure silica. The viscosity of the high solids slurry is less than about 1000 centipoises. Processes for producing the aqueous high solids silica slurry are disclosed. In one embodiment, a wet cake of amorphous precipitated hydrated silica is liquified and the liquified wet cake charged to a high intensity mill wherein the silica is wet milled until the median agglomerate particle size of the silica is between about 0.3 and about 3 microns. In a further embodiment, finely-divided dry amorphous precipitated silica is slurried in a dispersion mill to the desired solids level and this slurry charged to a high-intensity mill and wet milled therein until the aforesaid agglomerate particle size range is attained. The resulting high solids slurry can be shipped in bulk with only mild agitation to prevent setting. A dispersant may also be added to the slurry prior to milling to retard settling of the silica.

32 Claims, No Drawings

HIGH SOLIDS AQUEOUS SILICA SLURRY

CROSS-REFERENCE TO RELATED APPLICATIONS

This application is a continuation-in-part application of our application Ser. No. 07/248,852, filed Sept. 22, 1988, of the same title.

DESCRIPTION OF THE INVENTION

The present invention relates to aqueous high solids slurries of amorphous precipitated hydrated silica as well as to processes for their production.

Amorphous precipitated hydrated silicas are used in a variety of commercial applications such as, for example, in paper coatings, as thickeners and flatting agents, and as reinforcing agents or fillers in paper, natural and synthetic rubber, elastomers, paints, adhesives, etc. Typically, such silicas are supplied in dried, powder form, e.g., in paper bags or as bulk shipments in hopper cars. Such packaging requires the customer to handle a finely-divided, sometimes dusty product, and in some instances to dispose of paper bags in which the silica is packaged. Often, the customer's manufacturing process requires that the silica be added in the form of an aqueous slurry. This further necessitates preparation of the silica slurry by the customer. In the case of bulk shipments, the silica powder may, under certain conditions, cake and be difficult to remove from the hopper car, i.e., the silica may not readily fluidize or flow freely from the hopper car.

It would be useful if amorphous, precipitated hydrated silica could be provided in the form of an aqueous slurry so that such a slurry (after an optional adjustment for concentration) could be added directly to the customer's manufacturing process, thereby eliminating preparation or the slurry by the customer. For example, when silica is used as a filler in certain rubber products that are prepared using a rubber latex, such as in the production of rubber gloves, it would be desirable to mix an aqueous silica slurry with the rubber latex. In addition, product in the form of a slurry would avoid handling of a sometimes dusty product, which has the usual drawbacks associated with finely-divided dry materials, and further would eliminate disposal of the paper bags in which the dry silica is usually packaged.

As the art recognizes, when an aqueous slurry of a conventional inorganic pigment, such as amorphous precipitated hydrated silica, is stored or shipped in large containers, such as in tank cars or large drums, without continuous vigorous agitation or without the addition of a dispersing amount of dispersants, the pigment tends to settle to the bottom of the container and form a thick, caked deposit. Such deposits may be on the order of 1 to 2 feet thick in tank cars. It has been found difficult to re-slurry such settled silica so that it may be removed, e.g., by pumping, from the container. The problems associated with emptying containers having a caked deposit of silica can be significant and have dictated against shipping silica in the form of a high solids aqueous slurry. In addition, the cost of shipping an aqueous slurry of silica containing a relatively low level of solids, e.g., from about 14 to about 25 percent solids, over long distances is a further impediment to the shipment of silica in the form of an aqueous slurry.

It has now been surprisingly discovered that an aqueous slurry, particularly a high solids aqueous slurry, of amorphous precipitated silica that is a pumpable liquid, and that has a relatively low viscosity can be readily prepared. In accordance with the present invention, an aqueous slurry of amorphous, precipitated hydrated silica having a pH of from about 4 to about 9 is introduced into a high speed, fluid shear mill and the agglomerates comprising the silica particles reduced in size therein to a median agglomerate particle size of between about 0.3 and about 3 microns. Usually the silica introduced into such mill has a median agglomerate particle size of less than about 30 microns, more particularly less than 25 microns, e.g., from above 3 to about 25, preferably from about 7 to about 15, microns. In a further embodiment, the milled silica slurry may be dewatered to a more preferred higher solids content or additional finely-divided silica powder of the same grade or type may be added with agitation to the milled slurry until the desired solids level is obtained.

DETAILED DESCRIPTION OF THE INVENTION

Amorphous precipitated hydrated silicas are typically prepared by acidulation of aqueous solutions of alkali metal silicate. Such silicas and methods for their preparation are well known in the art. The silicas thus produced can be described as agglomerates of ultimate particles, which agglomerates have definite structures. As produced, agglomerates of ultimate silica particles (which ultimate particles range from about 10 to about 100 nanometers in diameter, depending on precipitation conditions) are generally between about 15 to 30 microns. These precipitated silicas are typically recovered from the acidulation process by filtration. The resulting silica filter cake is normally washed to remove residual alkali metal salt present as a consequence of the preparative process, the washed silica dried and the dried product dry milled.

Water-soluble alkali metal silicate that may be used to prepare amorphous precipitated hydrated silicas may be a commercial or technical grade of silicate, e.g., sodium silicate, potassium silicate or lithium silicate. Sodium silicate is readily available commercially and is the least expensive of the aforedescribed silicates and hence is the alkali metal silicate of choice. The alkali metal silicate may be represented by the molecular formula, $M_2O(SiO_2)_x$, wherein M is the alkali metal sodium, potassium or lithium, and $x$ is a number from 1 to 5. More commonly, x is a number from 2 to 4, such as between 3.0 and 3.4, e.g., 3.2 or 3.3. The aqueous alkali metal silicate reactant solution concentration can vary widely. For example, sodium silicate solutions may be used having an $Na_2O$ concentration of from about 18.75 grams per liter to about 90 grams per liter.

Acidifying agents generally used in the process of preparing amorphous precipitated hydrated silicas are inorganic acids, such as carbonic acid, hydrochloric acid or sulfuric acid. A sufficient amount of acidification agent is used in the acidulation step so that the recovered dried silica product will exhibit a pH between about 4.0 and about 9.0, e.g., from about 4 to about 8.5. The desired value for the pH of the recovered silica will depend on the ultimate application of the milled silica product. The pH of the silica is determined by measuring the pH of a 5 weight percent aqueous suspension of the particular silica at 25° C.

The acidulated aqueous alkali metal silicate reaction slurry, i.e., the silica product slurry, is filtered and the filter cake washed with water to reduce the amount of by-product alkali metal salt, i.e., the alkali metal salt of the acidification agent, to commercially acceptable levels, e.g., from about 0.5 to 2.0 weight percent, usually 1.0 to 2.0 weight percent. This filter cake is then dried using conventional drying means, e.g., spray or rotary driers, and the dried product dry milled or ground to obtain a silica of the desired degree of fineness.

The filter cake, although having the appearance of a moist solid, contains a relatively large amount of water. The water associated with the silica content of such filter cake has been referred to as structural water because it occupies the available space between the silica agglomerates and also the space inside the silica agglomerates. See, for example, U.S. Pat. No. 4,157,920. When precipitated silicas hold a high percentage of water, i.e., from about 70 to about 85 weight percent, they have been referred to as high structure silicas. Precipitated silicas holding less than 70 weight percent water, e.g., from about 50 to about 70 weight percent, have been referred to as low structure silicas.

The solids content of the filter cake obtained by filtering the reaction slurry of an amorphous, precipitated high structure silica may vary, depending on the type of precipitated silica produced, from about 9 to about 28 or 30 weight percent. Attempts to produce a slurry of greater than 35 weight percent solids from such a filter cake, e.g., by the use of a mechanical liquifier, colloid or dispersion mill, such as a Cowles mill, results in the formation of a non-liquid, non-flowable, non-pumpable solid even though the amount of water in the solid is greater than 50 weight percent.

The upper limit for the solids content for a readily flowable and pumpable aqueous slurry of high structure silicas prepared from a filter cake using conventional liquifiers or dispersion mills is from about 0 to about 6 weight percent less than the solids content of the filter cake for that particular silica. Pumpable, aqueous slurries prepared by re-wetting dried silica using such mills may contain up to about 30 to 35 weight percent silica, but at higher solids levels, the viscosity of the slurry becomes too high to be pumpable. Transporting aqueous silica slurries having these relatively low levels of solids is economically unattractive. Moreover, a financial penalty is paid to first dry the filter cake and then re-slurry the dried silica. In addition, many applications for aqueous silica slurries require a significantly higher level of solids than 30–35 percent.

Chemically, dried amorphous precipitated hydrated high structure silica commonly contains at least 85, usually at least 88, weight percent $SiO_2$ on an anhydrous basis, i.e., not including free water (water removed by heating at 105° C. for 24 hours).

The BET surface area of precipitated silicas typically varies from about 30 to about 300 square meters per gram. The surface area of the precipitated silicas product may be varied within that range by varying the conditions of precipitation, techniques which are known to those skilled in the art. More recently, amorphous precipitated silica having a BET surface area of up to about 700 m$^2$/gram has been described. See U.S. Pat. No. 4,495,167. The BET method for measuring surface area is that described in J. Am. Chem. Soc. 60, 309 (1938) by Brunauer, Emmett and Teller. BET surface areas reported herein were obtained using nitrogen as the gas adsorbed.

The oil absorption of such precipitated silicas may vary from about 80 to about 350 milliliters of oil, e.g., dibutyl phthalate, per 100 grams of silica, usually between about 120 and 280 milliliters of oil per 100 grams of silica.

In accordance with an embodiment of the present invention, an aqueous slurry containing less than about 50 or 55 weight percent, preferably at least 40 weight percent, of amorphous, precipitated hydrated high structure silica solids is charged to a high intensity mill, e.g., a high speed fluid shear wet mill, and the silica solids so charged to the high intensity mill are milled therein for a time sufficient to reduce the median agglomerate particle size of the silica to between about 0.3 and 3 microns, e.g., between about 0.5 and 2.0 microns, preferably between about 1.0 and about 1.5 microns, as measured by a Coulter counter. The silica charged to the high intensity mill will customarily have a pH of from about 4 to about 8.5, more preferably from about 4 to about 8, and still more preferably from about 5.5 to about 7.5, and having a median agglomerate size of less than about 30 microns, e.g., from above 3 to about 25 microns.

Milling times in the high intensity mill will vary; but, generally will be for a time sufficient to reduce the silica agglomerate size to within the range desired. Milling times may range between about 2 and about 60 minutes, more usually between about 3 and about 25 minutes. If a significant quantity of the silica agglomerates charged to the high intensity mill are substantially larger than 25 microns, the mill will not effect a significant reduction in the size of the large agglomerates because the grinding media in such mills is too small, vis a vis, the size of the silica agglomerates. Consequently, it may be necessary to first reduce the median agglomerate size of that quantity of large silica agglomerates to less than about 25 microns before charging the slurry to the high intensity mill. This first stage reduction may be accomplished in conventional dispersion mills and/or moderate intensity mills, as described herein.

The silica slurry charged to the high intensity mill can be obtained by liquifying filter cake obtained from the recovery of precipitated silica in the aforedescribed process for preparing amorphous precipitated silica. In the liquification step, the wet filter cake, which may contain between about 9 and about 30 weight percent silica solids, is liquified with mechanical agitation and, if needed, the addition of small amounts of water, e.g., in a conventional dispersion or colloid mill such as a Cowles, Colloid, Premier or Kotthoff mill. In addition, previously dried silica, i.e., silica obtained by drying the filter cake (and optionally dry-milling the dried silica) may be re-slurried to prepare the slurry charged to the high intensity mill. In such latter embodiment, dry amorphous precipitated silica is charged to a conventional dispersion, colloid or moderate intensity mill and wet milled therein to obtain the desired silica slurry. Such slurry will customarily have a solids content of up to 30–35 weight percent. Water may be added to the mill simultaneously with the silica, prior to or subsequent to the silica charged to the mill. Preferably, the water is added to the mill prior to the silica charge. The amount of silica and water used are adjusted to produce a slurry of the desired solids content. Moderate intensity mills permit the preparation of slurries having a higher solids content than conventional dispersion or colloid mills, and may be used, for example, to prepare slurries of from 35 to 50 or 55 percent solids.

To increase the solids content of the slurry introduced to the high intensity mill from that obtained from the conventional dispersion or colloid mill, additional dry silica of the same type or grade may be added to the slurry while subjecting the slurry to moderately intensive milling, e.g., in a Kady mill. Such milling (in a moderate intensity mill) will reduce the size of the silica agglomerates, e.g., to a median agglomerate size in the range of about 7 to about 25 microns, and allow the preparation of relatively fluid, pumpable slurries of moderate viscosity having a solids content of from about 35 to about 45 percent. It is contemplated that pumpable slurries from about 35 to 50 or 55 percent solids also may be prepared using the moderate intensity mill, e.g., a Kady mill. Care should be observed to prevent the discharge product from the moderate intensity mill from settling as it will do so in the absence of continued agitation or without the use of dispersants. More particularly, the lower the solids content of the discharge from the moderate intensity mill, the more fluid will be the slurry and the less energy required to maintain the solids in suspension. Slurries having 35 to 40 percent solids will require mild agitation to maintain the dispersion, whereas slurries having 40 to 45 or 50 percent solids will require more vigorous agitation, i.e., the higher the solids content, the higher the energy input required to keep the solids dispersed and vice versa. Moderately intense milling will reduce, if necessary, the silica median agglomerate particle size to that more suitable for the high intensity mill, e.g., from about 7 to 25 microns, but more particularly, will reduce the number of oversized agglomerates, i.e., those greater than 25 to 30 microns, to a particle size within the aforesaid range.

In another embodiment, it is contemplated that a liquified silica filter cake or silica slurry prepared from dried silica will be charged to a moderate intensity mill and the resulting milled product dewatered to the desired solids content, e.g., from 35 to 50 or 55 percent, and this dewatered slurry charged to the high intensity mill. The silica filter cake or silica slurry can, of course, be liquified or prepared respectively in a moderate intensity mill rather than have such slurries prepared in a conventional dispersion mill and that product charged to the moderate intensity mill.

In a preferred embodiment, the solids level of the aqueous slurry charged to the high intensity mill is at substantially the desired level for the product slurry so that de-watering of the product slurry is not necessary. The highest solids level that can be achieved for the slurry feed to the high intensity mill is conditioned on the particular silica being used, the median agglomerate particle size of the silica in the feed, which may be a function of the type of milling to which the silica is subjected prior to high intensity milling, the source of the feed, i.e., liquified wet cake or re-slurried dried silica, the pH of the silica, and any dewatering or other treatment of the slurry used to increase its solid content.

Any commercially available high speed, high intensity fluid shear mill capable of reducing conventional precipitated silica agglomerates having a median agglomerate size of less than 30 microns, e.g., from above 3 to less than 30 microns, such as to about 25 microns, to a median agglomerate size of less than about 3 microns may be used to wet mill the aforedescribed silica slurry feed. Examples of such high speed fluid shear mills are the Morehouse mill, which is a high speed disk type of mill manufactured by Morehouse-Cowles, Inc., and the Premier high intensity mill, which is manufactured by the Premier Mill Corp.

It has been surprisingly found that the wet milled silica product removed from the high intensity mill retains essentially the same performance properties as the product recovered from the reaction slurry, i.e., the physical performance properties of the milled silica in the ultimate application, e.g., in paper, are the same as the non-high intensity milled washed filter cake product or the dried and dry milled silica product obtained from said washed filter cake. Thus, the high intensity wet milled silica product retains its high structure properties. The BET surface area of the high intensity milled silica remains substantially the same as the silica charged to the mill. The viscosity of the milled silica slurry removed from the high intensity mill is generally less than about 1000 centipoises. Usually the smaller the median agglomerate size of the wet milled silica, i.e., below 3 microns, the lower will be the viscosity of the high intensity milled silica slurry for an equivalent solids content. Viscosities of the high intensity wet milled silica slurry may be less than about 500 centipoises, sometimes less than about 250, e.g., from about 50 to about 150 centipoises, as measured by a Brookfield viscometer. A slurry of less than about 1000 centipoises is a very flowable liquid and is readily pumpable. Slurries of less than 200 centipoises are milk-like in character. By pumpable, is meant that the slurry can be pumped by any pump designed to transfer slurries. Liquid slurries of less than 1000 centipoises are easily subject to being transferred by pumps, e.g., centrifugal pumps.

In addition, it has been surprisingly discovered also that when the high intensity milled silica slurry is added to liquid paper coating compositions, it does not increase the viscosity of such compositions as much as the conventional dry milled dried powdered form of a corresponding silica used in that application. Moreover, it has been discovered further that a high intensity milled silica slurry that is maintained under mild agitation does not show an increase in viscosity with time, e.g., during storage, as is characteristic of conventional silica slurries.

The silica product removed from the high intensity mill will customarily have the same solids content as the feed to the mill, e.g., between about 15 and about 50 or 55 weight percent solids, preferably between about 30 or 40 and 50 or 55 weight percent solids, will be a flowable liquid, and will be pumpable. This product may be dewatered, if needed, by standard evaporative techniques such as vacuum evaporation, cross-flow filtration, continuous centrifugation, expression filtration, etc. The wet cake resulting from such liquid-solid separation techniques can be readily reslurried by liquefaction for transportation as a slurry, or for use by the customer. Dewatering, if practiced, is continued until the solids of the dewatered product reaches the desired level, e.g., between about 40 and about 60 weight percent solids, preferably from about 45 to 55 weight percent solids.

Thus, in accordance with the present invention, there is provided a pumpable aqueous solids slurry comprising from about 40 to 60 weight percent of amorphous precipitated silica, and water as the dispersing medium, the silica having a median agglomerate particle size of less than 3 microns, and the slurry having a viscosity of less than about 1000 centipoises. As used herein, the percent solids in the slurry is the value obtained by subtracting from 100 the amount of water in the slurry, e.g., as determined by an Ohaus moisture balance.

In another contemplated embodiment, the aqueous dispersion of wet milled silica discharged from the high intensity mill may be mixed with similar and compatible finely-ground, dry amorphous precipitated silica until the resultant mixture reaches the desired solids level, e.g., of between about 40 and about 60 weight percent.

The high solids aqueous dispersion of amorphous precipitated silica obtained from the high intensity mill may be shipped in bulk, e.g., by tank truck or railroad tank car, with only mild agitation to prevent settling. Such agitation may be provided by bubbling air through the dispersion, e.g., by means of a series of internal spargers installed near the bottom of the cargo container through which compressed air is passed, or by the rocking motion of the moving tank truck or tank car. Some settling of the silica may still occur; but, the settled silica may be readily re-dispersed by subjecting it to agitation with agitating means known to those skilled in the art. Alternatively, a dispersant may be added to the silica before, during or after the high intensity milling to retard settling of the milled silica.

Dispersants that may be used with the milled silica slurry are finely-divided solids that are chemically and physically compatible with the silica and the product application in which the milled silica is to be used. Such solids include pigments used in the paper and rubber industry such as clays, titanium dioxide, calcium carbonate, magnesium carbonate, talc, zinc oxide, sodium polyphosphate, hydrated aluminas and insoluble inorganic salts such as barium sulfate. Mixtures of such materials may also be used. The solids may be either smaller or larger than the milled silica since their function is to keep the silica particles separated. Preferably, the size distribution of such solid dispersants is unimodal rather than bimodal. Water soluble dispersants for pigments such as polyacrylates, e.g., low molecular weight sodium polyacrylate, polyacrylic acids and/or partially neutralized polyacrylic acids may also be used.

Typically, the amount of water-soluble dispersant used will be that amount sufficient to maintain the high intensity wet milled silica in a dispersed state, e.g., a dispersing amount, which typically is less than about 15 weight percent, based on the amount of silica in the milled slurry. For example, from about 0.1 to about 15 weight percent; more particularly, from about 0.15 to about 5, e.g., 0.2 to 1.2, weight percent of water soluble dispersants may be used.

Insoluble inorganic salts may be used also as dispersants in dispersing amounts, e.g., less than 15 weight percent, such as from 0.5 to 10 or 15 weight percent. Pigmentary material described hereinabove may be used in dispersing amounts to avoid hard settling, e.g., 0.5 to 10 or 15 weight percent, or in amounts that will modify the basic characteristics of the silica slurry and influence the performance of the resulting blend. For example, aqueous dispersions of a blend of silica and titanium dioxide or clay are contemplated. The amount of pigmentary materials thus may vary from as low as about 0.5 weight percent to as high as about 70 weight percent.

The present invention is more particularly described in the following examples which are intended as illustrative only, since numerous modifications and variations therein will be apparent to those skilled in the art.

EXAMPLE 1

10,000 grams of a washed, wet cake of amorphous, precipitated hydrated high structure silica prepared by acidifying an aqueous sodium silicate solution with sulfuric acid was charged to a 5-gallon pail. The wet cake comprised about 31 percent silica solids. Dried silica obtained from such silica wet cake typically has a pH of about 8.5, an oil absorption of about 150 milliliters/100 grams, a BET surface area of about 35 square meters per gram ($m^2/g$), a hydrated silica content (dry basis) of about 88 weight percent, about 1.5 weight percent of by-product sodium sulfate salt and a median agglomerated particle size of about 12 microns. Such precipitated silica is available as SAN-SIL TM CG 102 from SAN-TEK, a business unit of PPG Industries, Inc.

The 5-gallon pail containing the silica wet cake was placed under the blade of a Premier Mill Lab Dispersator. The Dispersator blade was turned slowly for 3 to 5 minutes while 2400 milliliters of water were added to the pail. When all of the water had been added, the rate of rotation of the blade was increased until a vortex developed. The resulting fluid slurry had a silica solids content of 25 percent. The median particle size (Coulter Counter) of the solids in the slurry was 19 microns.

All of the fluid slurry prepared using the Premier Dispersator was charged to a HM 1.5 Premier mill and milled therein. The calculated residence time in the grinding chamber was about 2½ minutes. The grinding configuration of the mill was a urethane coated disk straight Delrin spacer having a disk peripheral speed of 2700 FPM (feet per minute) (13.7 meters per second) and a grinding chamber 85 percent filled with 1.25–1.60 millimeter (mm) zirconium silicate spheres. The grinding conditions were: shell inlet pressure—zero PSIG (pounds per square inch); slurry inlet temperature—64° F. (17.8° C.); slurry outlet temperature—76° F. (24.4° C.); slurry flow rate—3.2 GPH (gallons per hour) (0.012 $m^3/hr$); and power consumption—3.5 amperes. The product discharged from the mill was a flowable liquid having a Brookfield viscosity of 100 centipoises (cps) (measured with No. 2 spindle, 100 rpm at room temperature). The Coulter Counter median particle size of the silica in the product was 1.55 microns; but the slurry was also microscopically observed to contain a small fraction of oversized (>25–30 micron) particles. This indicated that the slurry charged to the high intensity mill contained particles to large to be significantly reduced by the mill. The percent solids of the liquid product was 25 percent.

EXAMPLE 2

A silica slurry containing 25 percent solids, which was prepared in the manner described in Example 1 using the Premier Mill Lab Dispersator, was charged to a Colloid mill and recirculated therein for 5 minutes. The Coulter Counter median particle size of the Colloid mill discharge was 14.5 microns. The Colloid mill discharge was forwarded to the HM 1.5 Premier high intensity mill described in Example 1 and milled using the same grinding conditions described in Example 1. The liquid product slurry of the high intensity mill had a Brookfield viscosity of about 100 centipoises and a solids level of 25 percent. The particles in the product slurry had a Coulter Counter median particle size of 1.50 microns. Microscopic observation of the product slurry did not reveal any oversized particles.

EXAMPLE 3

A slurry of amorphous precipitated hydrated high structure silica containing 25 weight percent solids was prepared in the manner described in Example 1 using the Premier Dispersator and silica of the type described in Example 1. A portion of this slurry was forwarded to a HM 15 Premier mill and milled therein. The calculated residence time in the grinding chamber was about 2½ minutes. The grinding configuration of the mill was a urethane coated disk straight Delrin spacer having a disk peripheral speed of 2700 FPM (13.7 meter per second) and a grinding chamber 85 percent filled with 1.25-1.60 mm zirconium silicate spheres. The grinding conditions were: shell inlet pressure—3 PSIG (20.7 kPA); slurry inlet temperature—66° F. (18.9° C.); slurry outlet temperature—90° F. (32.2° C.); slurry flow rate—32 GPH (0.12 m$^3$/hr); power consumption—24 amperes. The product discharged from the mill was a flowable liquid having a Brookfield viscosity of 100 centipoises. The Coulter Counter median particle size of the silica in the high intensity milled product was 1.39 microns. The percent solids of the liquid product was 25 percent.

EXAMPLE 4

The remainder of the Premier Dispersator 25 percent solids slurry prepared in Example 3 was divided into four equal portions and identified as Samples A, B, C and D. Sample A was the control. To Sample B was added 0.0775 pounds of Colloid 211 sodium polyacrylate solution as a dispersant for each pound of original wet cake and the mixture stirred for 5 minutes. This mixture was charged to the HM 1.5 Premier mill and ground using the grinding configuration and conditions described in Example 1. Sample C was mixed with 0.194 pounds of Colloid 211 dispersant, and Sample D was mixed with 0.388 pounds of Colloid 211 dispersant. Samples A, C and D were also milled in the HM 1.5 Premier Mill and ground using the grinding configuration and grinding conditions of Example 1. The Coulter Counter median particle sizes for the slurries milled with the HM 1.5 Premier mill were: Sample A—1.85 microns; Sample B—1.55 microns; Sample C—1.55 microns; Sample D—1.53 microns.

A portion of milled samples A, B, C and D were stored at ambient temperature in quart cans for five months. Only the silica of Sample A was observed to have hard settling. Samples, B, C and D could be reslurried by shaking the cans in which the samples were stored by hand. This shows that hard settling can be prevented by the use of suitable dispersants. The Coulter Counter median particle size of the stored Sample C was redetermined and found to be 1.48 microns, which showed that no growth in median particle size of the silica had occurred during the 5 month aging of the sample.

EXAMPLE 5

Sufficient product of the HM 15 Premier milled 25 percent solids slurry from Example 3 was filtered through a Buchner funnel using Whatman No. 42 filter paper and aspirator vacuum to obtain enough wet cake for evaluation as a paper coating pigment. The Coulter Counter median particle size of the resulting wet cake was 1.9 microns. The percent solids in the wet filter cake was 54.5 percent. A Waring blender was charged with 50 milliliters of deionized water and, with the blender agitator rotating (Variac setting of 50), 201.9 grams of the 54.4 percent solids wet cake were added slowly to the mixer. The resulting fluid slurry had a Brookfield viscosity of 78 cps (No. 2 spindle, at 100 RPM, room temperature) and a Brookfield viscosity of 70 cps (No. 2 spindle, 20 RPM, room temperature). The percent solids of the fluid slurry was 45 percent (Ohaus moisture balance) and the Coulter Counter median particle size of the silica in the fluid slurry was 1.6 microns.

EXAMPLE 6

The following pigments were added in the order listed to water in a suitable container and stirred using a Cowles ® mixer. The amounts indicated are on a dry basis. Enough water was used to prepare a pigment slurry having 66.7 percent solids.

| Ingredient | Amount, grams |
|---|---|
| Hydrafine ™ Clay | 160.0 |
| Fluid Slurry of Example 5 (45 percent slurry) | 30.0 |
| Ti-Pure ® titanium dioxide* | 10.0 |

* Added as 13.3 grams of pre-dispersed Ti-Pure ® TiO$_2$

After all of the pigments had been added, mixing continued for 5 minutes. To this slurry was added in the order listed the following ingredients:

| Ingredient | Amount, grams |
|---|---|
| Penford Gum 280 starch (30 percent solids) | 10.0 |
| Dow Latex CP 620 NA (50 percent solids) | 20.0 |

The final slurry had a solids content of 61.7 percent. This slurry was used to coat a wood-free paper base sheet (basis weight=55 pounds/3300 sq. ft. (25 kg/306 m$^2$)) at levels around 5 pounds (2.3 kg) and 12 pounds (5.5 kg) coating/3300 sq. ft. (306 m$^2$) using a hand blade coater.

The coated sheet was dried for 3 to 5 minutes at 218° F. (103° C.) and placed in a 50 percent relative humidity/68° F. (20° C.) sample conditioning room overnight to equilibrate the sheet. The coat weight was determined by TAPPI procedure T-410 om-83. The brightness, opacity, gloss and ink receptivity were obtained using TAPPI procedures T-452 om-87, T-425 om-86 and T-480 om-85 respectively. The performance results for the coated sheet are reported as Run 1 in Table I for a calculated coat weight of 8 pounds/3300 ft$^2$ (3.6 kg/306 m$^2$).

The foregoing recipe and procedure were repeated with the same ingredients except that silica obtained by drying a washed wet cake equivalent to the wet cake of Examples 1 and 3 was used instead of the fluid slurry of Example 5. The performance results for the coated sheet are reported as Run 2 in Table I.

EXAMPLE 7

The procedure of Example 6 was followed to prepare a further paper coating pigment formulation using the following ingredients. The coating was used to coat a paper sheet as described in Example 6. The amounts indicated are on a dry basis. Enough water was used to prepare a pigment slurry having 62.6 percent solids.

| Ingredient | Amount, grams |
|---|---|
| Hydrafine ™ Clay | 150.0 |
| Fluid Slurry of Example 5 (45 percent slurry) | 46.0 |
| Ti-Pure ® titanium dioxide* | 4.0 |
| Penford Gum 280 starch (30 percent solids) | 10.0 |

-continued

| Ingredient | Amount, grams |
|---|---|
| Dow Latex CP 620 NA (50 percent solids) | 20.0 |

*Added as 5.3 grams of pre-dispersed Ti-Pure ® TiO$_2$

The final slurry had a solids content of 58.5 percent. Performance results for the coated sheet are reported as Run 3 in Table I for a calculated coat weight of 8 pounds/3300 ft$^2$ (3.6 kg/306 m$^2$).

The foregoing procedure was repeated with the same ingredients except that silica obtained by drying a washed wet cake equivalent to the wet cake of Examples 1 and 3 was used instead of the fluid slurry of Example 5. The performance results for the coated sheet are reported as Run 4 in Table I.

TABLE I[a]

| RUN NO. | BRIGHTNESS, % | OPACITY, % | INK RECEPTIVITY* | GLOSS |
|---|---|---|---|---|
| 1 | 81.3 | 93.1 | 27.9 | 49.4 |
| 2 | 81.4 | 92.1 | 26.7 | 40.7 |
| 3 | 82.0 | 92.2 | 31.1 | 46.5 |
| 4 | 81.0 | 92.2 | 31.8 | 33.3 |
| BASE SHEET | 78.6 | 86.0 | 42.1 | 9.0 |

*Ink Receptivity reported as % decrease.
[a] Data reported for a calculated coat weight of 8 pounds/3300 ft$^2$ (3.6 kg/306 m$^2$).

The data of Table I shows that the reported paper properties were not effected by the high energy milling of the silica except that the smaller mean particle size enhanced the gloss of the coated sheet.

EXAMPLE 8

The following pigments were added in the order listed to water charged to a suitable container and stirred using a Cowles ® mixer. Sufficient water was used to prepare a pigment slurry having 67.9 percent solids. Amounts indicated are on a dry basis.

| Ingredient | Amount, grams |
|---|---|
| Hydrafine TM Clay | 190.0 |
| Ti-Pure ® titanium dioxide* | 10.0 |

*Added as 13.3 grams of pre-dispersed Ti-Pure ® TiO$_2$

After all of the pigments had been added, mixing continued for 5 minutes. To this slurry was added in the order listed the following ingredients:

| Ingredient | Amount, grams |
|---|---|
| Penford Gum 280 starch (30 percent solids) | 10.0 |
| Dow Latex CP 620 NA (50 percent solids) | 20.0 |

The final slurry had a solids content of 62.5 percent. This slurry was used to coat a mechanical pulp base stock sheet (basis weight=28 pounds/3300 sq. ft.) (12.7 kg/306 m$^2$) at levels around 5 pounds (2.3 kg) and 12 pounds (5.5 kg) coating/3300 sq. ft. (306 m$^2$) using a hand blade coater. The coated sheet was dried for 3-5 minutes at 218° F. (103° C.) and placed in a 50 percent relative humidity 168° F. (20° C.) sample conditioning room overnight. The brightness, opacity, gloss and ink receptivity were obtained using the TAPPI procedures described in Example 6. The results are listed as Run No. 1 in Table II and is the control run for the series described in this Example for a calculated coat weight of 8 pounds/3300 ft$^2$ (3.6 kg/306 m$^2$).

The foregoing procedure was repeated except that the 10.0 grams of Ti-Pure ® titanium dioxide were replaced with 4.0 grams of Ti-Pure ® titanium dioxide and 6.0 grams of SAN-SIL TM CG 102 silica. The pigment slurry had a solids content of 68.5 percent. The final slurry (after adding the starch and latex) had a solids content of 62.5 percent. Results are tabulated in Table II as Run No. 2.

The procedure of Run No. 2 was repeated except that the 6.0 grams of SAN-SIL TM CG 102 silica was replaced with a equivalent amount of wet cake from Example No. 5 that was reslurried to a solids level of 45 percent using water and a Cowles ® mixer. Results are tabulated in Table II as Run No. 3.

The procedure of Run No. 1 was repeated except that the Ti-Pure ® titanium dioxide was replaced with 10.0 grams of SAN-SIL TM CG 102 silica of Run 2. Results are tabulated in Table II as Run No. 4.

The procedure of Run No. 4 was repeated, except that the 10.0 grams of silica was replaced with an equivalent amount of wet cake from Example 5 that was reslurried to a solids level of 45 percent using water and a Cowles ® mixer. Results are tabulated in Table II as Run No. 5.

TABLE II[a]

| RUN NO. | BRIGHTNESS, % | OPACITY, % | INK RECEPTIVITY* | GLOSS |
|---|---|---|---|---|
| 1 | 74.1 | 92.6 | 20.9 | 42.0 |
| 2 | 73.7 | 91.8 | 22.1 | 40.1 |
| 3 | 73.7 | 92.8 | 24.3 | 43.0 |
| 4 | 73.6 | 92.0 | 23.8 | 40.2 |
| 5 | 73.7 | 91.9 | 24.5 | 43.8 |
| BASE SHEET | 68.3 | 85.2 | 41.0 | 9.6 |

*Ink Receptivity reported as % decrease.
[a] Data reported for a calculated coat weight of 8 pounds/3300 ft$^2$ (3.6 kg/306 m$^2$)

The data of Table II show that brightness and opacity are equivalent to the control, but ink receptivity is significantly increased for Runs 2-5, with better results for the high intensity milled silica used in Runs 3 and 5. Further, the gloss for Runs 3 and 5 is significantly better than that obtained with unmilled silica, i.e., Runs 2 and 4, and marginally better than the control, i.e., Run 1.

EXAMPLE 9

A Kady mill was charged with 1260 grams of water and 700 grams of SAN-SIL TM CG 102 silica. The mixture was mixed by hand until the mass was wet and then the mill was started. An additional 700 grams of the silica were added slowly and the resulting mixture mixed in the mill for 15 minutes. The percent moisture of the silica in the mill was analyzed and found to be about 47 percent. The slurry, which was very viscous, was charged to a Premier high intensity vertical laboratory mill. The main drive peripheral speed of the mill is 2100 ft/minute (6.1 meters/second) and the grinding chamber was 60 percent filled with 1.25-1.6 mm. zirconium silicate beads. The resulting mill product was a very fluid slurry having a Brookfield viscosity of 70 cps (No. 2 spindle, 20 rpm, room temperature) and 78 cps (No. 2 spindle, 100 rpm, room temperature). The Coulter Counter median particle size of the final milled product was 1.35 microns. The percent solids of the final milled product was 47 percent.

EXAMPLE 10

A suitable container was charged with 160 grams of ASTRA PLATE SD delaminated clay, 40 grams of No. 2 coating clay (KCS SD)-both available from Georgia Kaolin, and enough water to produce a slurry containing 70 percent solids. This slurry was mixed in a Premier Mill Lab Dispersator at 85 percent maximum speed for 5 minutes. To this milled slurry was added on a dry weight basis 12 grams of Penford Gum 290 starch, 18 grams of Dow Latex CP 620 NA, 2.4 grams of Calsan TM 50 calcium stearate lubricant, 0.5 grams of Colloid 211 dispersant and sufficient water to give a final solids content of 52 percent. This mixture was stirred for one minute and then used to coat a merchant grade wood free basestock having a basis weight of 52 pounds/3300 ft$^2$ (23.6 kg/306 m$^2$) with a Modern Metalcraft Laboratory Coater run at a speed to give a coating weight of 6.75–7.25 pounds/3300 ft$^2$ (3–3.3 kg/306 m$^2$). The dryer drum was set at 248° F. (120° C.). The coated sheet was supercalendered using a Beloit Wheeler laboratory supercalender (3 passes, 1500 psi [0.01 MPa], speed of 3, temperature of 150° F. [65.6° C.]). The calendered sheet was placed in a 50 percent relative humidity 168° F. (20° C.) sample conditioning room overnight. Brightness, gloss, opacity and ink receptivity were obtained using the TAPPI procedures described in Example 6. Results are reported as Run 1 in Table III.

The above-described procedure of Run 1, was followed to prepare a paper coating composition and coated paper except that the pigment slurry used 153.6 grams of the delaminated clay, 38.4 grams of No. 2 coating clay, 8.0 grams of SAN-SIL TM KU 33 silica and enough water to produce a slurry containing 68.5 percent solids. SAN-SIL TM KU 33 is an amorphous precipitated silica similar to SAN-SIL TM CG 102 except that it has a pH of 7.0, an agglomerated particle size of 2.5 microns, a BET surface area of 70 m$^2$/g and an oil absorption of about 135 ml/100 gram as typical physical properties. Results are tabulated in Table III as Run No. 2.

The above-described procedure of Run 2 was followed except that the SAN-SIL TM KU 33 was replaced by an equivalent amount of the 47 percent slurry prepared in Example 9. Results are tabulated in Table III as Run No. 3.

The above-described procedure of Run 2 was followed to prepare a paper coating composition and coated paper except that the pigment slurry used 147.2 grams of the delaminated clay, 36.8 grams of the No. 2 coating clay, 16.0 grams of SAN-SIL TM KU 33 and enough water to give a slurry containing 66.9 percent solids. Results are tabulated in Table III as Run No. 4.

The above-described procedure of Run 4 was followed except that the SAN-SIL TM KU 33 was replaced with an equivalent amount of the 47 percent slurry prepared in Example 9. Results are tabulated in Table III as Run No. 5.

TABLE III$^a$

| RUN NO. | BRIGHTNESS, % | OPACITY, % | INK RECEPTIVITY* | GLOSS |
|---|---|---|---|---|
| 1 | 83.6 | 91.1 | 91.2 | 48.6 |
| 2 | 84.8 | 91.0 | 83.9 | 49.1 |
| 3 | 85.1 | 90.8 | 82.7 | 50.4 |
| 4 | 85.3 | 91.1 | 84.0 | 50.8 |
| 5 | 85.0 | 91.0 | 83.7 | 50.3 |
| BASE SHEET | | | | |

*Ink Receptivity reported as brightness values.
$^a$Data reported for a calculated coat weight of 6.75–7.25 pounds/3300 ft$^2$ (3–3.3 kg/306 m$^2$).

The data of Table III show that all properties measured were significantly better than or equal to the control (Run 1) and the optical properties as measured in Runs 3 and 5 are equivalent to those reported for Runs 2 and 4, thereby indicating that high intensity milling of silica as described herein does not change its high structure properties.

Although the present invention has been described with reference to specific details of certain embodiments thereof, it is not intended that such details should be regarded as limitations upon the scope of the invention, except as and to the extent that they may be included in the accompanying claims.

We claim:

1. A pumpable aqueous slurry of precipitated silica wherein the slurry contains from about 40 to about 60 weight percent of amorphous precipitated silica having a median agglomerate particle size of from about 0.3 to about 3 microns and a pH of from about 4 to about 8.5, said aqueous slurry having a Brookfield viscosity of less than 1000 centipoises.

2. The silica slurry of claim 1 wherein the slurry contains from about 40 to about 55 weight percent of amorphous precipitated silica having a pH of from about 4 to about 8.

3. The silica slurry of claim 2 wherein the amorphous precipitated silica has a pH of from about 5.5 to about 7.5.

4. The silica slurry of claim 3 wherein the slurry contains from about 40 to about 50 weight percent of the amorphous precipitated silica.

5. The silica slurry of claim 2 wherein the viscosity of the slurry is less than about 500 centipoises.

6. The silica slurry of claim 1 wherein the silica has a median agglomerate particle size of from about 0.5 to about 2 microns.

7. The silica slurry of claim 4 wherein the silica has a median agglomerate particle size of from about 0.5 to about 2 microns.

8. The silica slurry of claim 1 wherein the slurry contains a dispersing amount of a water soluble dispersant.

9. The silica slurry of claim 8 wherein the slurry contains from about 0.1 to about 15 weight percent of a water soluble dispersant.

10. The silica slurry of claim 9 wherein the water soluble dispersant is a polyacrylate.

11. The silica slurry of claim 1 wherein the slurry contains a dispersing amount of pigment selected from the group consisting of clays, titanium dioxide, calcium carbonate, magnesium carbonate, talc, zinc oxide, hydrated alumina, and mixtures of such pigments.

12. A process for producing a pumpable slurry of precipitated silica, comprising wet milling amorphous, precipitated silica having a median agglomerate particle size of from above 3 microns to less than 30 microns and a pH of from about 4 to about 8.5 for a time sufficient to reduce the silica agglomerates to a median agglomerate particle size of from about 0.3 to about 3 microns, thereby to produce a pumpable, aqueous silica slurry having a Brookfield viscosity of less than 1000 centipoises.

13. The process of claim 12 wherein the silica is milled in a high speed, fluid shear mill for between about 2 and about 60 minutes.

14. The process of claim 12 wherein the silica is milled in a high speed, fluid shear mill and the silica is charged to the mill as an aqueous slurry containing less than about 55 weight percent silica.

15. The process of claim 14 wherein the silica slurry charged to the mill contains from about 35 to 50 weight percent silica having a pH of from about 4 to about 8.

16. The process of claim 15 wherein the silica slurry charged to the mill contains from about 0.1 to about 15 weight percent of a water-soluble dispersant.

17. The process of claim 12 wherein the silica is milled in a high speed, fluid shear mill, the silica is charged to the mill as an aqueous slurry containing less than about 50 weight percent silica, the silica so charged has a median agglomerate size of from above 3 to about 25 microns, the milled silica has a median agglomerate particle size of from about 0.5 to about 2 microns, and the aqueous silica slurry produced by the high speed, fluid shear mill has a Brookfield viscosity of less than 500 centipoises.

18. The process of claim 17 wherein the silica is charged to the mill as an aqueous slurry containing at least about 35 weight percent amorphous precipitated silica having a pH of from about 5.5 to about 7.5.

19. The process of claim 18 wherein the silica is milled in the presence of from about 0.1 to about 15 weight percent of a water-soluble polyacrylate dispersant.

20. The process of claim 17 wherein the milled silica slurry is dewatered and an aqueous silica slurry containing from about 40 to about 60 weight percent silica prepared therefrom.

21. A process for producing a pumpable, aqueous silica slurry, which comprises wet milling an aqueous slurry of amorphous, precipitated silica, said slurry containing at least about 35 weight percent silica having a median agglomerate particle size of from above 3 to less than about 30 microns and a pH of from about 4 to about 8.5, in a high speed, fluid shear mill for a time sufficient to reduce the silica agglomerates to a median particle size of from about 0.5 to about 2 microns, thereby to produce a pumpable, aqueous silica slurry having a Brookfield viscosity of less than 500 centipoises.

22. The process of claim 21 wherein the silica is milled for between about 2 and about 60 minutes.

23. The process of claim 21 wherein the silica milled in the high speed, fluid shear mill has a median agglomerate particle size of from above 3 to about 25 microns and a pH of from about 5.5 to about 7.5.

24. A process for producing a pumpable, aqueous silica slurry, which comprises wet milling an aqueous slurry of amorphous precipitated silica containing at least about 35 weight percent silica, said silica having a pH of from about 4 to about 8.5, in a moderate intensity mill for a time sufficient to reduce the silica agglomerates to a median agglomerate particle size of from about 7 to about 25 microns, thereby to produce a first milled aqueous silica slurry, milling first milled aqueous slurry in a high speed, fluid shear mill for a time sufficient to reduce further the silica agglomerates to a median particle size of from about 0.3 to about 3 microns, thereby to produce a pumpable, aqueous silica slurry product having a Brookfield viscosity of less than 1000 centipoises.

25. The process of claim 24 wherein the aqueous silica slurry milled in the moderate intensity mill is prepared by liquifying silica filter cake obtained from the recovery of precipitated silica.

26. The process of claim 24 wherein the aqueous silica slurry milled in the moderate intensity mill is prepared by re-slurrying finely-divided dry amorphous precipitated silica.

27. The process of claim 24 wherein the silica milled in the moderate intensity mill has a pH of from about 4 to about 8, the median particle size of the silica agglomerates produced by the high speed, fluid shear mill is from about 0.5 to about 2 microns and the pumpable aqueous silica slurry product has a Brookfield viscosity of less than 500 centipoises.

28. The process of claim 27 wherein the median agglomerate particle size of the silica feed to the moderate intensity mill is less than about 30 microns and the Brookfield viscosity of the aqueous silica slurry discharged form the high speed, fluid shear mill is less than about 250 centipoises.

29. The process of claim 27 wherein the aqueous silica slurry milled in the moderate intensity mill contains from about 35 to about 50 weight percent silica and is prepared by either liquifying silica filter cake obtained from the recovery of precipitated silica, or by re-slurrying finely-divided dry amorphous precipitated silica.

30. The process of claim 29 wherein the first milled aqueous silica slurry is milled in a high speed fluid shear mill in the presence of from about 0.1 to about 15 weight percent of a water-soluble dispersant.

31. The process of claim 30 wherein the water-soluble dispersant is a polyacrylate.

32. The silica slurry of claim 7 wherein the viscosity of the slurry is less than 250 centipoises.

* * * * *